(12) United States Patent
Mallick et al.

(10) Patent No.: US 11,175,840 B2
(45) Date of Patent: Nov. 16, 2021

(54) HOST-BASED TRANSFER OF INPUT-OUTPUT OPERATIONS FROM KERNEL SPACE BLOCK DEVICE TO USER SPACE BLOCK DEVICE

(71) Applicant: EMC IP Holding Company LLC, Hopkinton, MA (US)

(72) Inventors: Sanjib Mallick, Bangalore (IN); Md Haris Iqbal, Kolkata (IN); Kundan Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 72 days.

(21) Appl. No.: 16/777,162

(22) Filed: Jan. 30, 2020

(65) Prior Publication Data
US 2021/0240375 A1 Aug. 5, 2021

(51) Int. Cl.
*G06F 9/54* (2006.01)
*G06F 3/06* (2006.01)
*G06F 9/50* (2006.01)

(52) U.S. Cl.
CPC ............ *G06F 3/0635* (2013.01); *G06F 3/061* (2013.01); *G06F 9/505* (2013.01); *G06F 9/545* (2013.01); *G06F 3/0679* (2013.01)

(58) Field of Classification Search
None
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |

(Continued)

FOREIGN PATENT DOCUMENTS

| | | |
|---|---|---|
| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Elias Mamo
(74) *Attorney, Agent, or Firm* — Ryan, Mason & Lewis, LLP

(57) ABSTRACT

An apparatus in one embodiment comprises a host device comprising a processor coupled to memory. The host device is configured to communicate over a network with at least one storage system. The host device is further configured to generate a user space block device and to generate a kernel space block device corresponding to the user space block device. The host device is further configured to receive an input-output operation at the kernel space block device from an application executing on the host device and to transfer the input-output operation from the kernel space block device to the corresponding user space block device. The host device is further configured to submit the input-output operation to the at least one storage system based at least in part on the user space block device.

20 Claims, 4 Drawing Sheets

(56) References Cited

U.S. PATENT DOCUMENTS

| | | | |
|---|---|---|---|
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,073,674 | B2 * | 12/2011 | Gehr ............... G06F 9/4411 703/24 |
| 8,086,846 | B2 * | 12/2011 | Brabson ............ H04L 67/1014 713/151 |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,400,611 | B1 | 7/2016 | Raizen |
| 9,489,392 | B2 * | 11/2016 | Wang ................ G06F 16/178 |
| 9,594,780 | B1 | 3/2017 | Esposito et al. |
| 9,647,933 | B1 | 5/2017 | Tawri et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,639 | B2 | 12/2019 | Mallick et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2013/0117766 | A1 | 5/2013 | Bax et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0231948 | A1 * | 8/2016 | Gupta ................. G06F 3/067 |
| 2016/0335003 | A1 | 11/2016 | Ahmed et al. |
| 2017/0123971 | A1 * | 5/2017 | Kanaujia ............. G06F 12/10 |
| 2017/0235507 | A1 | 8/2017 | Sinha et al. |
| 2018/0189635 | A1 | 7/2018 | Olarig et al. |
| 2018/0210665 | A1 * | 7/2018 | Anumula ............ G06F 3/0665 |
| 2018/0253256 | A1 | 9/2018 | Bharadwaj |
| 2018/0317101 | A1 | 11/2018 | Koue |
| 2019/0095299 | A1 | 3/2019 | Liu et al. |
| 2019/0108888 | A1 | 4/2019 | Sarkar et al. |

FOREIGN PATENT DOCUMENTS

| | | | |
|---|---|---|---|
| EP | | 2667569 A1 | 11/2013 |
| WO | PCT/US2019/052549 | | 12/2019 |
| WO | PCT/US2019/053204 | | 12/2019 |
| WO | PCT/US2019/053473 | | 12/2019 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

U.S. Appl. No. 15/795,653 filed in the name of Maneesh Pusalkar et al. Oct. 27, 2017, and entitled "Storage System with Network-Wide Configurable Device Names."

U.S. Appl. No. 16/142,274 filed in the name of Sanjib Mallick et al. Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. Sep. 28, 2018, and entitled "Host Device with Multi-Path Layer Implementing Path Selection Based At Least In Part on Fabric Identifiers."

U.S. Appl. No. 16/155,491 filed in the name of Kundan Kumar et al. Oct. 9, 2018, and entitled "Migrating Control of a Multi-Path Logical Device from a Current MPIO Driver to a Target MPIO Driver."

U.S. Appl. No. 16/155,429 filed in the name of Rimpesh Patel et al. Oct. 9, 2018, and entitled "Categorizing Host IO Load Pattern and Communicating Categorization to Storage System."

U.S. Appl. No. 16/697,393 filed in the name of Vinay G. Rao et al. Nov. 27, 2019, and entitled "Automated Seamless Migration of Logical Storage Devices."

U.S. Appl. No. 16/710,828 filed in the name of Amit Pundalik Anchi et al. Dec. 11, 2019, and entitled "Automated Seamless Migration with Signature Issue Resolution."

U.S. Appl. No. 16/587,533 filed in the name of Md Haris Iqbal et al. Sep. 30, 2019, and entitled "Performing Input-Output Multi-Pathing from User Space."

* cited by examiner

HOST-BASED TRANSFER OF INPUT-OUTPUT OPERATIONS FROM KERNEL SPACE BLOCK DEVICE TO USER SPACE BLOCK DEVICE

FIELD

The field relates generally to information processing systems, and more particularly to storage in information processing systems.

BACKGROUND

Storage arrays and other types of storage systems are often shared by multiple host devices over a network. A host device may comprise a multipath input-output (MPIO) driver that is configured to process input-output (IO) operations for delivery from the host device to the storage system. In a typical information processing system, the MPIO driver generates a multipath device in the kernel space of the host device which comprises a set of paths to a logical volume of the storage system. The MPIO driver then relies on the kernel space multipath device for load balancing and delivery of the IO operations along the paths to the storage system.

SUMMARY

Illustrative embodiments provide techniques for interfacing applications using kernel space block devices with IO load balancing and submission functionality in the user space.

In one embodiment, an apparatus comprises a host device comprising a processor coupled to memory. The host device is configured to communicate over a network with at least one storage system. The host device is further configured to generate a user space block device and to generate a kernel space block device corresponding to the user space block device. The host device is further configured to receive an input-output operation at the kernel space block device from an application executing on the host device and to transfer the input-output operation from the kernel space block device to the corresponding user space block device. The host device is further configured to submit the input-output operation to the at least one storage system based at least in part on the user space block device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
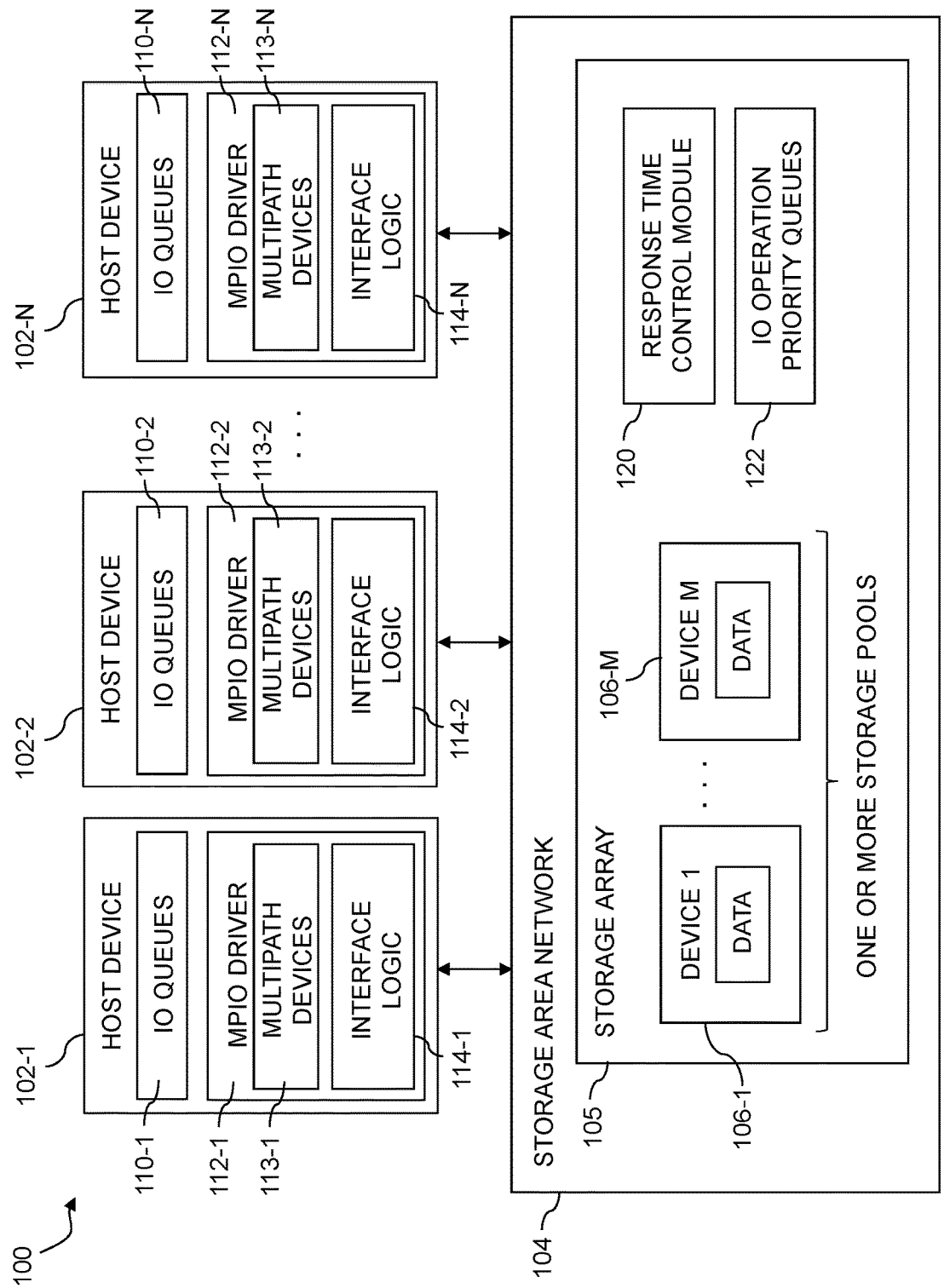
FIG. 1 is a block diagram of an information processing system configured with functionality for interfacing applications using kernel space block devices with IO load balancing and submission functionality in the user space in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement LUNs configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective functionality for implementing interface logic 114-1, 114-2, . . . 114-N. In some embodiments, one or more of the host devices 102 may also optionally comprise respective MPIO drivers, e.g., MPIO drivers 112-1, 112-2, . . . 112-N. The MPIO drivers 112 collectively comprise a multipath layer of the host devices 102. In some embodiments, the MPIO drivers 112 may comprise functionality for implementing the interface logic 114.

In illustrative embodiments, the host devices 102 also comprise respective multipath devices 113-1, 113-2, . . . 113-N. Multipath devices 113 are logical devices that comprise information on one or more paths from a host device 102 to a corresponding logical volume such as, e.g., a LUN, of a storage device 106. The individual block devices representing each path are known as native devices. For example, the MPIO drivers 112 group the information on all paths, e.g., native devices, from a host device 102 to a corresponding logical volume into a multipath device 113 for that logical volume. An MPIO driver 112 routes received IO operations from the host device 102 to the corresponding logical volume according to the information found in the multipath device 113 corresponding to that logical volume. In some embodiments, a multipath device 113 may be included as part of a respective MPIO driver 112 of a host device 102. In some embodiments, the multipath device 113 may be implemented separately from an MPIO driver 112 of a host device 102 or may be implemented on a host device 102 that does not include an MPIO driver 112.

Applications use a multipath device for submitting IO operations to the SAN 104 so that the IO operations may be distributed across all available paths. When paths fail, the MPIO driver will typically redirect the IO operations to other alive paths in the multipath device.

The MPIO drivers described herein may comprise, for example, otherwise conventional MPIO drivers, such as PowerPath® drivers from Dell EMC of Hopkinton, Mass., suitably modified in the manner disclosed herein to implement for interfacing applications using kernel space block devices with IO load balancing and submission functionality in the user space. Other types of MPIO drivers from other driver vendors may be suitably modified to incorporate for interfacing applications using kernel space block devices with IO load balancing and submission functionality in the user space as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers 112 of the multipath layer or by the host device 102 as needed in order to discover the addition of new paths or the deletion of existing paths.

A given path discovery scan can be performed utilizing known functionality of conventional MPIO drivers, such as PowerPath® drivers, or by other drivers or software found on a host device 102.

The path discovery scan in some embodiments may be further configured to identify one or more new LUNs or other logical volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for interfacing applications using kernel space block devices with IO load balancing and submission functionality in the user space. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support functionality for interfacing applications using kernel space block devices with IO load balancing and submission functionality in the user space.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017 and entitled "Storage System with Input-Output Performance Control Utilizing Application Process Detection," which issued as U.S. Pat. No. 10,474,367 on Nov. 12, 2019, the entirety of which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and interface logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
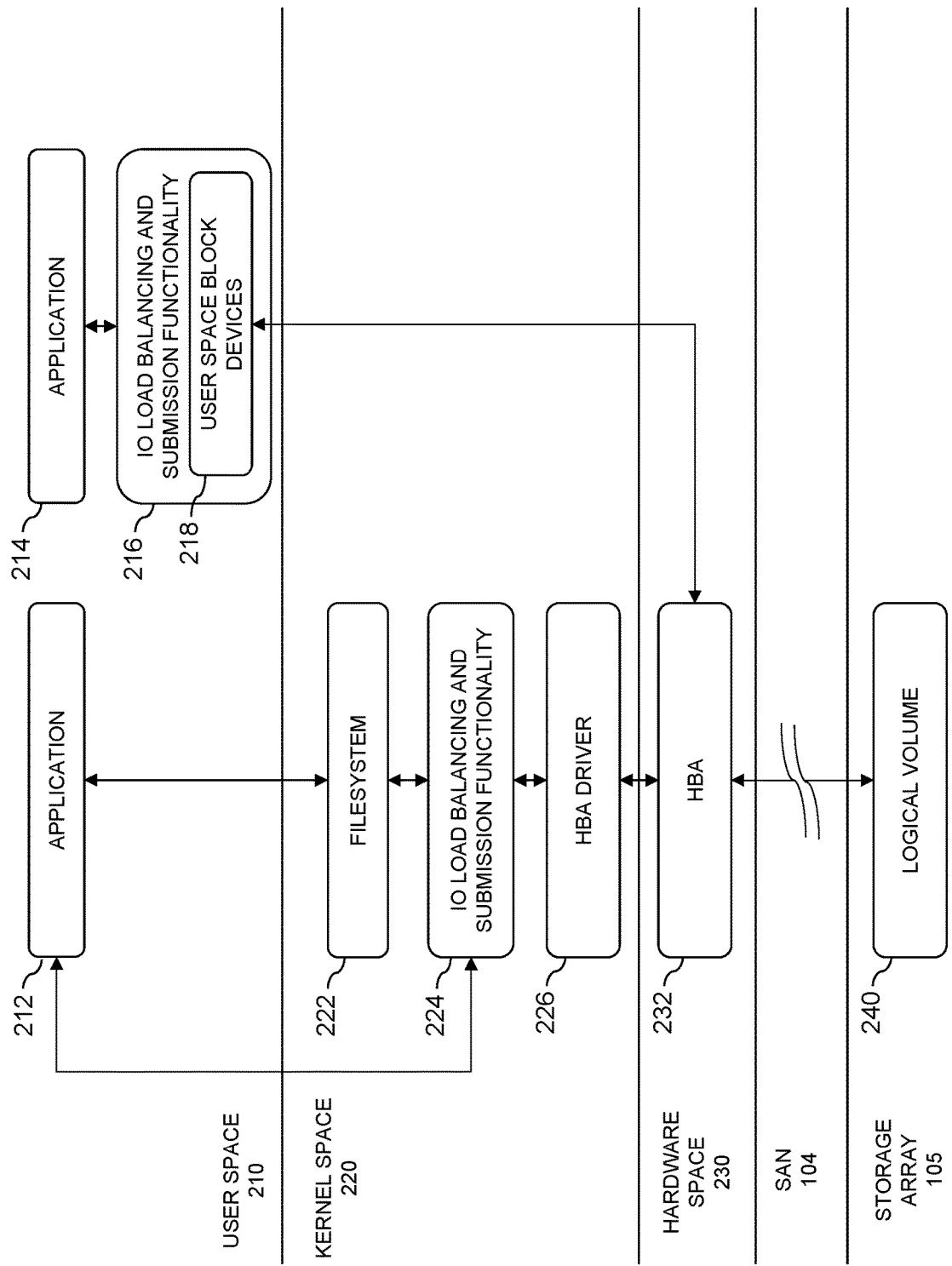
FIG. 2 is a diagram illustrating an example interaction path between a host device and a logical volume of a storage system in an illustrative embodiment.

With reference to FIGS. 1 and 2, an example host device 102-1 comprises a user space 210, kernel space 220 and hardware space 230. The hardware space 230 comprises one or more hardware bus adapters (HBAs), e.g., an HBA 232, ports or other communication interfaces that are configured to communicate with corresponding components of the storage array 105 via the SAN 104 to submit IO operations to the storage array 105 for corresponding logical volumes, e.g., logical volume 240, over one or more paths. In some cases, one or more additional networks, e.g., the internet or other networks, may be disposed between the HBAs of the hardware space 230 and the SAN 104 where, for example, IO operations submitted via the HBAs of the hardware space 230 to the storage array 105 may traverse the one or more additional networks to reach the SAN 104.

As mentioned above, MPIO drivers often group information about all of the paths between a host device and a storage array 105 for a given logical volume into a logical device, also known as a multipath device. Multipath devices are utilized by the MPIO drivers of the host device to distribute IO operations across all of the available paths to a given logical volume. An application 212 and kernel space filesystem 222 typically utilize kernel space-based IO load balancing and submission functionality 224 to distribute the IO operations across the paths associated with the given logical volume in the corresponding the multipath device. For example, the application 212 and filesystem 222 typically rely on the use of IO stacks, interrupts, lock contentions and other kernel space-based functionality residing in the kernel space for implementing the IO load balancing and submission functionality 224.

For example, as seen on the left side of FIG. 2, an application 212 residing in the user space 210 interfaces with IO load balancing and submission functionality 224 residing in the kernel space 220, either directly or via a kernel space-based filesystem 222 such as, e.g., an ext4 filesystem, an xfs filesystem, a btrfs filesystem or other similar kernel-based filesystems, to submit IO operations to the storage array 105 via an HBA 232 residing in the hardware space 230. The IO load balancing and submission functionality 224 is used in conjunction with an HBA driver 226 to submit the IO operations from host device 102 to the storage array 105 via the corresponding HBA 232 of a given path selected by the IO load balancing and submission functionality 224.

As multipathing technologies have improved, the IO load balancing and submission functionality has, in some cases, completely moved to the user space 210 for some applications. This means that IO operations that are submitted by applications for delivery to the storage array 105 no longer utilize the IO load balancing and submission functionality 224 residing in the kernel space 220. These applications instead rely on IO load balancing and submission functionality 216 residing in the user space 210 which utilizes function calls and libraries in the user space to form and establish connections with the storage array 105 from the user space 210. The IO load balancing and submission functionality 216 does not require the use of the IO stack, interrupts or other functionality in the kernel space 220. After the establishment of a connection by the IO load balancing and submission functionality 216, IO operations for the applications are submitted to the storage array 105 by the IO load balancing and submission functionality 216 via the HBAs in the hardware space 230 from the user space 210 without requiring use of the IO load balancing and submission functionality 224 found in the kernel space 220.

For example, as seen on the right side of FIG. 2, a user space-based application 214 residing in the user space 210 interfaces with IO load balancing and submission functionality 216 residing in the user space. The IO load balancing and submission functionality 216 is configured to submit IO operations to the storage array via HBA 232 using user space-based function calls and libraries and user space block devices 218. In this case, IO load balancing and submission functionality 216 does not utilize the functionality found in the kernel space 220 for submitting the IO operations to the logical volume 240 of the storage array 105 via the HBA 232.

The use of user space IO load balancing and submission functionality 216 which does not utilize the IO stack, interrupts, lock contentions, or other similar kernel space-based functionality for submitting IO operations to the storage array 105, provides higher throughput and efficiency as compared to the use of the kernel space-based IO load balancing and submission functionality 224. This is because the kernel space-based IO stack, interrupts, lock contentions and other kernel space functionality utilized by the IO load balancing and submission functionality 224 often requires additional resources or time to process and distribute the IO operations as compared to the function calls and libraries residing in the user space 210 which are utilized by the IO load balancing and submission functionality 216. Such IO load balancing and submission functionality 216 may, for example, generate user space block devices 218 for each path to a logical volume, which may be grouped into a multipath device as described above, and may utilize various kinds of underlying communication protocols to communicate with the storage system including, for example, remote direct memory access (RDMA), transmission control protocol (TCP) and internet small computer systems interface (iSCSI) or other communication protocols. These connections may, for example, be made to a storage array 105 that supports non-volatile memory express over fabric (NVMeOF) target functionality.

While application 214 relies on IO load balancing and submission functionality 216 residing in the user space 210 for pathing and communication with the storage array 105, application 212, which utilizes kernel space-based IO load balancing and submission functionality 224, may not be able to interface with the IO load balancing and submission functionality 216 in the user space 210 since the kernel space-based components such as, e.g., the filesystem 222, IO load balancing and submission functionality 224 and HBA driver 226, are utilized for submitting the IO operations to the storage array 105.

Figure 3:
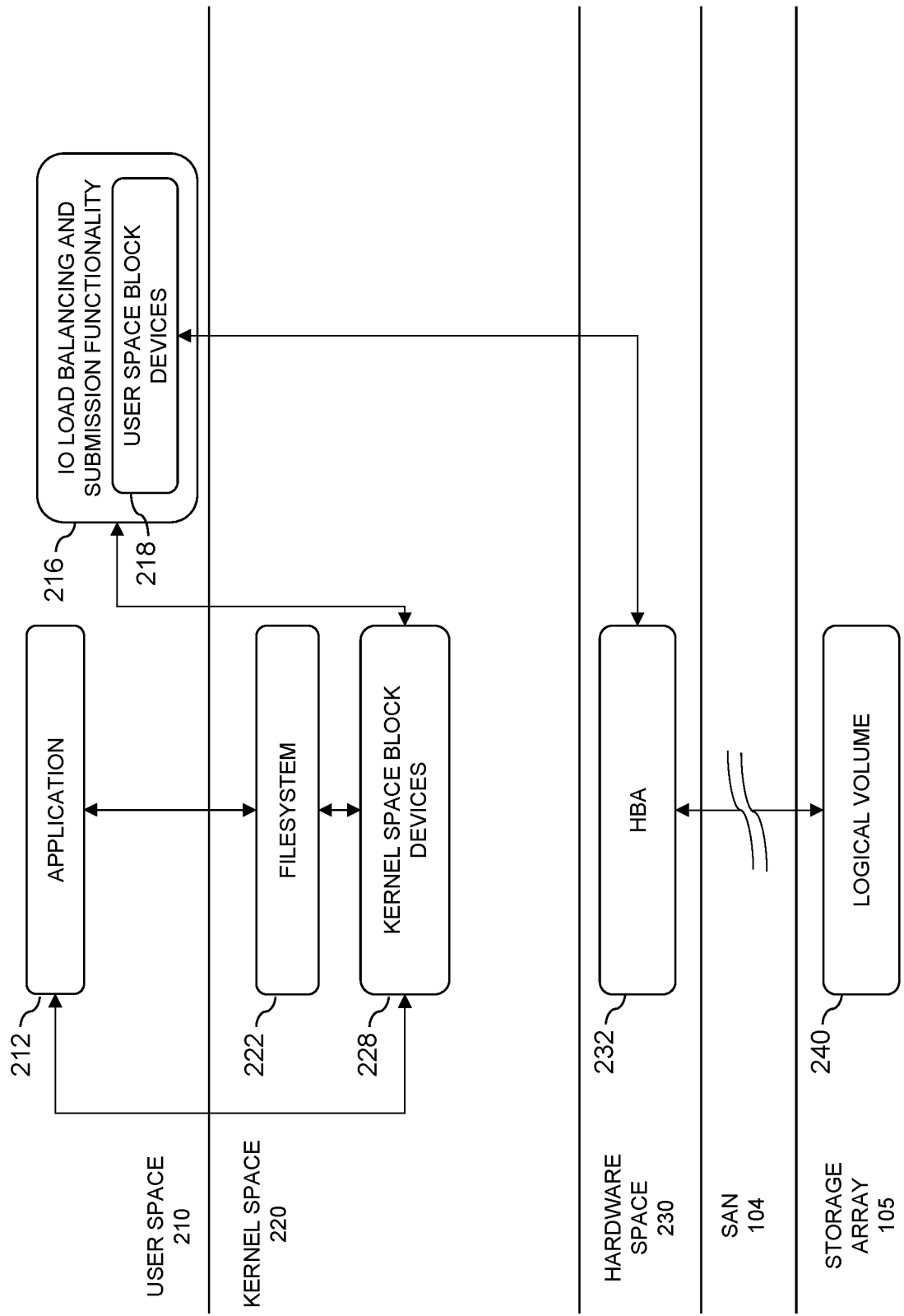
FIG. 3 is a diagram illustrating an example interaction path between a host device and a logical volume of a storage array using functionality for interfacing applications using kernel space block devices with IO load balancing and submission functionality in the user space in an illustrative embodiment.

With reference to FIG. 3, in illustrative embodiments, interface logic 114 is disclosed which comprises functionality for interfacing kernel-based applications such as, e.g., application 212, and filesystems such as, e.g., filesystem 222, with user space-based IO load balancing and submission functionality 216 via the kernel space 220. For example, interface logic 114 may determine which logical volumes are exposed to the IO load balancing and submission functionality 216 and also determine the available paths for one or more of the logical volumes. The paths for each logical volume may be grouped together by multipath devices, for example, using their respective unique identifiers. For the logical volumes that are exposed to the IO load balancing and submission functionality 216, interface logic 114 generates user space block devices 218 in the user space 210 and corresponding kernel space block devices 228 in the kernel space 220 which may be used by the application 212 or filesystem 222 to interface with the IO load balancing and submission functionality 216. For example, the kernel space block device 228, which resides in the kernel space 220, transfers IO operations received from the application 212 or filesystem 222 to the IO load balancing and submission functionality 216 in the user space 210. For example, the IO operations may be transferred to the IO load balancing and submission functionality 216 using inter-process communication (IPC) network sockets or any interface which is configured to copy data from the kernel space 220 to user space 210. The IO load balancing and submission functionality 216 may then perform load balancing and distribute the IO operations via the HBA 232 along one or more paths to the storage array 105.

The interface logic 114 allows an application 212 or kernel space-based filesystem 222 to utilize the user space IO load balancing and submission functionality 216 without requiring a reconfiguration of the application 212 or the kernel space-based filesystem 222.

Illustrative embodiments of the techniques and functionality of interface logic 114 will now be described in more detail with reference to the flow diagram of FIG. 4.

Figure 4:
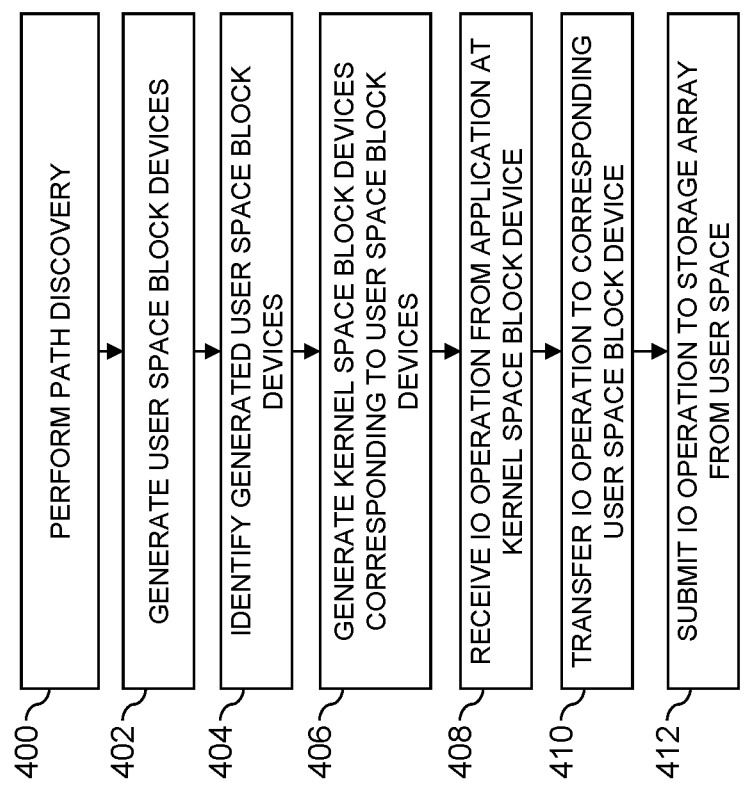
FIG. 4 is a flow diagram of an example process for interfacing applications using kernel space block devices with IO load balancing and submission functionality in the user space in an illustrative embodiment.

The process as shown in FIG. 4 includes steps 400 through 412, and is suitable for use in the system 100 but is more generally applicable to other types of systems comprising multiple host devices and a shared storage system. The process will be described with reference also to FIGS. 1 and 3.

At step 400, in conjunction with or after a boot up of a given host device 102, the IO load balancing and submission functionality 216 of the given host device 102 performs path discovery and establishes connections between the host device 102-1 and the storage array 105 of the storage system. For example, the IO load balancing and submission functionality 216 may establish connections between the host device 102-1 and the storage array 105 from the user space 210 using one or more user space-based communication protocols such as, e.g., RDMA, TCP, or other communication protocols. For these connections, various native paths between the host device 102 and the logical volumes of the storage array 105 are generated.

At step 402, IO load balancing and submission functionality 216 generates corresponding user space block devices 218 in the user space 210 for the generated native paths.

At step 404, the interface logic 114 identifies the generated user space block devices 218. If present, the interface logic 114 may also identify any other multipath devices.

At step 406, for each unique user space block device 218 in the user space 210, interface logic 114 generates corresponding kernel space block devices 228 in the kernel space 220. The kernel space block devices 228 are configured to transfer IO operations between the corresponding user space block device 218 and applications or filesystems which rely on kernel space-based IO load balancing and submission functionality 224 for submitting IO operations to the storage array 105. For example, the kernel space block devices 228 are configured to copy and transfer data between application 212 operating in the user space 210 and the user space block devices 218 operating in the user space 210 via the kernel, e.g., using IPC sockets or other communication methods. The IPC sockets may, for example, be fast enough to handle the throughput of the user space IO load balancing and submission functionality 216.

At step 408, the one or more kernel space block devices 228 receive an IO operation from application 212.

At step 410, the one or more kernel space block devices 228 transfer the IO operation to one or more of the corresponding user space block devices 218 of the IO load balancing and submission functionality 216.

At step 412, the IO load balancing and submission functionality 216 obtains the transferred IO operation and submits the IO operation to the storage array 105 from the user space along one or more of the paths corresponding to the user space block devices 218 via the HBA 232 in the hardware space 230 without utilizing the kernel space. Likewise, any response or IO operation received by the IO load balancing and submission functionality 216 from the storage array 105 may be transferred from the IO load balancing and submission functionality 216 user space block devices 218 in the user space 210 to the application 212 or kernel space-based filesystem 222 via the corresponding kernel space block devices 228 in the kernel space 220.

In some embodiments, input-output control (IOCTL) calls may also be transferred between applications or kernel space-based filesystems and the IO load balancing and submission functionality 216 in the user space 210 in a similar manner.

Separate instances of the process of FIG. 4 may be performed in respective additional host devices that share the storage array.

The particular processing operations and other system functionality described in conjunction with the flow diagram of FIG. 4 are presented by way of illustrative example only, and should not be construed as limiting the scope of the disclosure in any way. Alternative embodiments can use other types of processing operations involving host devices, storage systems and interface logic. For example, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different interface logic arrangements within a given information processing system.

Functionality such as that described in conjunction with the flow diagram of FIG. 4 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for interfacing applications using kernel space block devices with IO load balancing and submission functionality in the user space are carried out at least in part under the control of its interface logic 114. For example, interface logic 114 is illustratively configured to control performance of portions of the process shown in the flow diagram described above in conjunction with FIG. 4.

As indicated previously, absent use of the functionality for interfacing applications using kernel space block devices with IO load balancing and submission functionality in the user space as disclosed herein, applications and kernel space-based filesystems which rely on kernel space-based IO load balancing and submission functionality are unable to utilize user space-based IO load balancing and submission functionality. This leads to inefficiencies in the storage system as well as in the host device since kernel space-based IO load balancing and submission functionality requires the use of kernel IO stacks, interrupts and other kernel space-based functionality.

Such drawbacks are advantageously overcome in illustrative embodiments herein by utilization of interface logic 114 to implement functionality for interfacing applications using kernel space block devices with IO load balancing and submission functionality in the user space in a manner which allows these applications and kernel space-based filesystems to transfer IO commands to the user space IO load balancing and submission functionality via the kernel space for submission to the storage array from the user space.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the interface logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, interface logic and additional or alternative components. Also, the particular configurations of system and device elements and associated processing operations illustratively shown in the drawings can be varied in other embodiments. For example, a wide variety of different MPIO driver configurations and associated interfacing arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to memory, the host device being configured to communicate over a network with at least one storage system along a plurality of paths, wherein the host device is further configured:
to generate a user space block device in a user space of the host device, the user space block device corresponding to a path of the plurality of paths between the host device and the at least one storage system;

to generate a kernel space block device in a kernel space of the host device, the kernel space block device corresponding to the user space block device;

to receive an input-output operation at the kernel space block device from an application executing on the host device;

to transfer the input-output operation from the kernel space block device to the corresponding user space block device;

to select a path of the plurality of paths based at least in part on the transferred input-output operation and the user space block device; and to submit the transferred input-output operation to the at least one storage system based at least in part on the selected path using the user space block device.

2. The apparatus of claim 1 wherein the user space block comprises information about at least one path from the host device to a given logical volume of the at least one storage system.

3. The apparatus of claim 1 wherein the host device further comprises communication hardware that is configured to communicate with the at least one storage system, the user space block device being configured to submit the transferred input-output operation directly from the user space to the communication hardware in the hardware space, the communication hardware being configured to provide the transferred input-output operation to the at least one storage system based at least in part on the selected path.

4. The apparatus of claim 1 wherein:
the host device comprises input-output load balancing and submission functionality residing in the user space; and
submitting the transferred input-output operation to the at least one storage system comprises submitting the transferred input-output operation to the at least one storage system based at least in part on the user space block device and the input-output load balancing and submission functionality residing in the user space.

5. The apparatus of claim 1 wherein the transferred input-output operation is submitted to the at least one storage system from the user space without utilizing functionality in the kernel space.

6. The apparatus of claim 1 wherein the host device is configured to transfer the input-output operation from the kernel space block device to the user space block device based at least in part on at least one communication protocol that is configured to transfer data between the user space and the kernel space of the host device.

7. A method comprising:
generating a user space block device in a user space of a host device, the user space block device corresponding to a path of a plurality of paths between the host device and at least one storage system;
generating a kernel space block device in a kernel space of the host device, the kernel space block device corresponding to the user space block device;
receiving an input-output operation at the kernel space block device from an application executing on a host device;
transferring the input-output operation from the kernel space block device to the corresponding user space block device;
selecting a path of the plurality of paths based at least in part on the transferred input-output operation and the user space block device; and
submitting the transferred input-output operation to the at least one storage system based at least in part on the selected path using the user space block device;

wherein the method is implemented by the host device, the host device comprising a processor coupled to a memory.

8. The method of claim 7 wherein the user space block comprises information about at least one path from the host device to a given logical volume of the at least one storage system.

9. The method of claim 7, wherein the host device further comprises communication hardware that is configured to communicate with the at least one storage system, the user space block device being configured to submit the transferred input-output operation directly from the user space to the communication hardware in the hardware space, the communication hardware being configured to provide the transferred input-output operation to the at least one storage system based at least in part on the selected path.

10. The method of claim 7, wherein:
the host device comprises input-output load balancing and submission functionality residing in the user space; and
submitting the transferred input-output operation to the at least one storage system comprises submitting the transferred input-output operation to the at least one storage system based at least in part on the user space block device and the input-output load balancing and submission functionality residing in the user space.

11. The method of claim 7, wherein the transferred input-output operation is submitted to the at least one storage system from the user space without utilizing functionality in the kernel space.

12. The method of claim 7, wherein the host device is configured to transfer the input-output operation from the kernel space block device to the user space block device based at least in part on at least one communication protocol that is configured to transfer data between the user space and the kernel space of the host device.

13. A computer program product comprising a non-transitory processor-readable storage medium having stored therein program code of one or more software programs, wherein the program code, when executed by a host device comprising a processor coupled to a memory, causes the host device:
to generate a user space block device in a user space of the host device, the user space block device corresponding to a path of a plurality of paths between the host device and at least one storage system;
to generate a kernel space block device in a kernel space of the host device, the kernel space block device corresponding to the user space block device;
to receive an input-output operation at the kernel space block device from an application executing on the host device;
to transfer the input-output operation from the kernel space block device to the corresponding user space block device;
to select a path of the plurality of paths based at least in part on the transferred input-output operation and the user space block device; and
to submit the transferred input-output operation to the at least one storage system based at least in part on the selected path using the user space block device.

14. The computer program product of claim 13 wherein the user space block device comprises information about at least one path from the host device to a given logical volume of the at least one storage system.

15. The computer program product of claim 13, wherein the host device further comprises communication hardware that is configured to communicate with the at least one storage system, the user space block device being configured to submit the transferred input-output operation directly from the user space to the communication hardware in the hardware space, the communication hardware being configured to provide the transferred input-output operation to the at least one storage system based at least in part on the selected path.

16. The computer program product of claim 13, wherein:
the host device comprises input-output load balancing and submission functionality residing in the user space; and
submitting the transferred input-output operation to the at least one storage system comprises submitting the transferred input-output operation to the at least one storage system based at least in part on the user space block device and the input-output load balancing and submission functionality residing in the user space.

17. The computer program product of claim 13, wherein the transferred input-output operation is submitted to the at least one storage system from the user space without utilizing functionality in the kernel space.

18. The computer program product of claim 13, wherein the host device is configured to transfer the input-output operation from the kernel space block device to the user space block device based at least in part on at least one communication protocol that is configured to transfer data between the user space and the kernel space of the host device.

19. The apparatus of claim 1 wherein:
the application executes on the host device in the user space;
the application is configured to generate the input-output operation in the user space; and
receiving the input-output operation at the kernel space block device from the application comprises obtaining the generated input-output operation from the application in the user space.

20. The method of claim 7, wherein:
the application executes on the host device in the user space;
the application generates the input-output operation in the user space; and
receiving the input-output operation at the kernel space block device from the application comprises obtaining the generated input-output operation from the application in the user space.

* * * * *